United States Patent
Roh et al.

(10) Patent No.: US 8,605,770 B2
(45) Date of Patent: Dec. 10, 2013

(54) ULTRA WIDEBAND MODULATION FOR BODY AREA NETWORKS

(75) Inventors: June Chul Roh, Allen, TX (US); Anuj Batra, Dallas, TX (US); Sudipto Chakraborty, Richardson, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 951 days.

(21) Appl. No.: 12/702,628

(22) Filed: Feb. 9, 2010

(65) Prior Publication Data

US 2010/0202494 A1   Aug. 12, 2010

Related U.S. Application Data

(60) Provisional application No. 61/151,007, filed on Feb. 9, 2009, provisional application No. 61/240,760, filed on Sep. 9, 2009.

(51) Int. Cl.
   *H04B 1/00*   (2006.01)

(52) U.S. Cl.
   USPC .......................................... 375/138; 375/130

(58) Field of Classification Search
   USPC .................. 375/138, 132, 130; 370/310, 252; 455/456.1, 433
   See application file for complete search history.

(56) References Cited

U.S. PATENT DOCUMENTS

| | | | |
|---|---|---|---|
| 2008/0045161 A1* | 2/2008 | Lee et al. | 455/73 |
| 2008/0285663 A1* | 11/2008 | Fischer | 375/259 |
| 2010/0014558 A1* | 1/2010 | Nieto et al. | 375/130 |

OTHER PUBLICATIONS

IEEE Std 802.154a™—2007, IEEE, New York, Aug. 31, 2007, 203 pages.
ECM Internationa, Standard ECMA-368, High Rate Ultra Wideband PHY and MAC Standard, 3rd Edition, Dec. 2008, 344 pages, Geneva.

* cited by examiner

*Primary Examiner* — Khai Tran
(74) *Attorney, Agent, or Firm* — Alan A. R. Cooper; W. James Brady, III; Frederick J. Telecky, Jr.

(57) ABSTRACT

A symbol modulation system applicable to a body area network is disclosed herein. The symbol modulation system includes a symbol mapper. The symbol mapper is configured to determine a time within a predetermined symbol transmission interval at which a transmission representative of the symbol will occur. The time is determined based on a value of a symbol and a value of a time-hopping sequence. The time is selected from a plurality of symbol value based time slots, and a plurality of time-hopping sequence sub-time-slots within each symbol value based time slot. The symbol mapper is configured to generate a single guard interval within the symbol transmission interval. The single guard interval is positioned to terminate the symbol transmission interval.

3 Claims, 4 Drawing Sheets

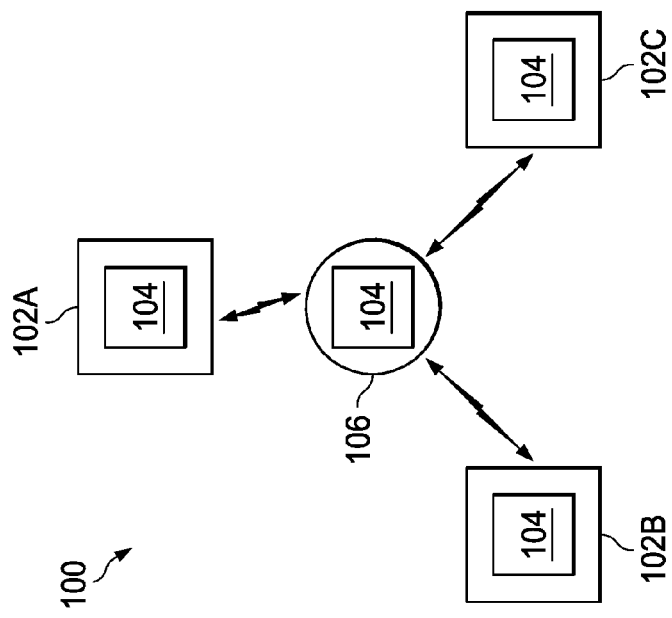
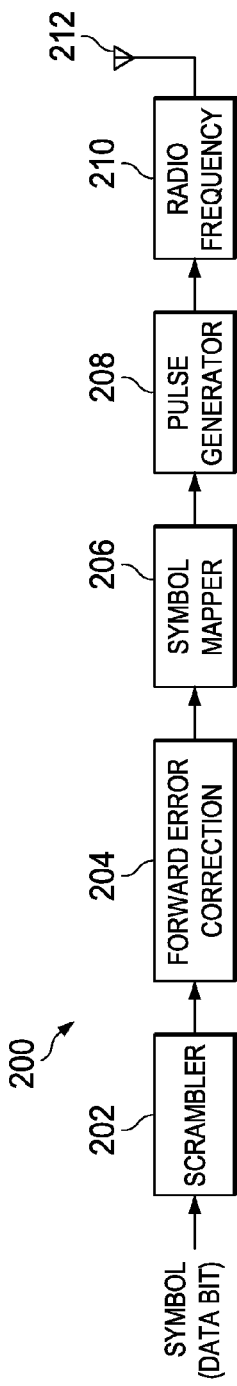

ULTRA WIDEBAND MODULATION FOR BODY AREA NETWORKS

CROSS-REFERENCE TO RELATED APPLICATIONS

This application is a non-provisional application claiming priority to provisional application Ser. No. 61/151,007 filed on Feb. 9, 2009, entitled "Direct-Sequence Burst-Position Modulation PHY for Body Area Networks (BAN)s," and to provisional application Ser. No. 61/240,760 filed on Sep. 9, 2009, entitled "Direct-Sequence Burst-Position Modulation PHY for Body Area Networks (BAN)s," both of which are incorporated by reference herein.

BACKGROUND

Body area networks (BAN) are a low-power short-range wireless technology that can be used for medical applications, such a digital band-aids and pacemakers, and for entertainment and consumer electronics applications, including heads-up displays and wireless gaming.

Body area networks are being designed for use in several radio frequency bands, including 400 MHz Medical Implant Communications Service ("MICS") band, 900 MHz and 2.4 GHz Industrial, Scientific and Medical ("ISM") band, and 3.1-10.6 GHz Ultra Wideband (UWB) band.

SUMMARY

A symbol modulation system applicable to a body area network is disclosed herein. In accordance with some embodiments, a symbol modulation system includes a symbol mapper. The symbol mapper is configured to determine a time within a predetermined symbol transmission interval at which a transmission representative of the symbol will occur. The time is determined based on a value of a symbol and a value of a time-hopping sequence. The time is selected from a plurality of symbol value based time slots, and a plurality of time-hopping sequence sub-time-slots within each symbol value based time slot. The symbol mapper is further configured to generate a single guard interval within the symbol transmission interval. The single guard interval is positioned to terminate the symbol transmission interval.

In accordance with at least some other embodiments, a method includes determining, by a symbol mapping circuit, a time within a predetermined symbol transmission interval at which a burst of pulses representative of a symbol to be transmitted will be occur. The determination is based on a value of the symbol and a value of a time-hopping sequence. The symbol mapping circuit also generates a single guard interval that terminates the transmission interval. The determined time is selected from a plurality of symbol value based time slots, and a plurality of time-hopping sequence sub-time-slots within each symbol value based time slot.

In accordance with yet other embodiments, a body area network includes an impulse radio ultra-wideband ("IR-UWB") transmitter and an IR-UWB receiver. The transmitter is configured to apply burst position modulation exclusively, and to apply a single guard interval period per symbol transmitted. The IR-UWB receiver is configured to receive transmissions of the ultra-wideband impulse-radio transmitter. The ratio of the guard interval period to a symbol transmission period is reduced as a data rate used to transmit the symbol decreases.

In accordance with some additional embodiments, a symbol modulation system includes a symbol mapper. The symbol mapper is configured to determine, based on a value of a time-hopping sequence, a time within a predetermined symbol transmission interval at which a signal burst representative of the symbol will be transmitted. The symbol mapper is also configured to determine, based on a value of the symbol, a modulation factor to apply to the signal burst during the time. The symbol mapper is further configured to generate a single guard interval within the symbol transmission interval. The time is selected from a plurality of time-hopping sequence time-slots within the predetermined symbol transmission interval. The single guard interval is positioned to terminate the symbol transmission interval.

BRIEF DESCRIPTION OF THE DRAWINGS

For a detailed description of exemplary embodiments of the invention, reference will now be made to the accompanying drawings in which:

FIG. 1 shows a representative Body Area Network ("BAN") in accordance with various embodiments;

FIG. 2 shows a block diagram for a portion of an Impulse Radio Ultra-Wideband ("IR-UWB") transmitter in accordance with various embodiments;

NOTATION AND NOMENCLATURE

Figure 3A:
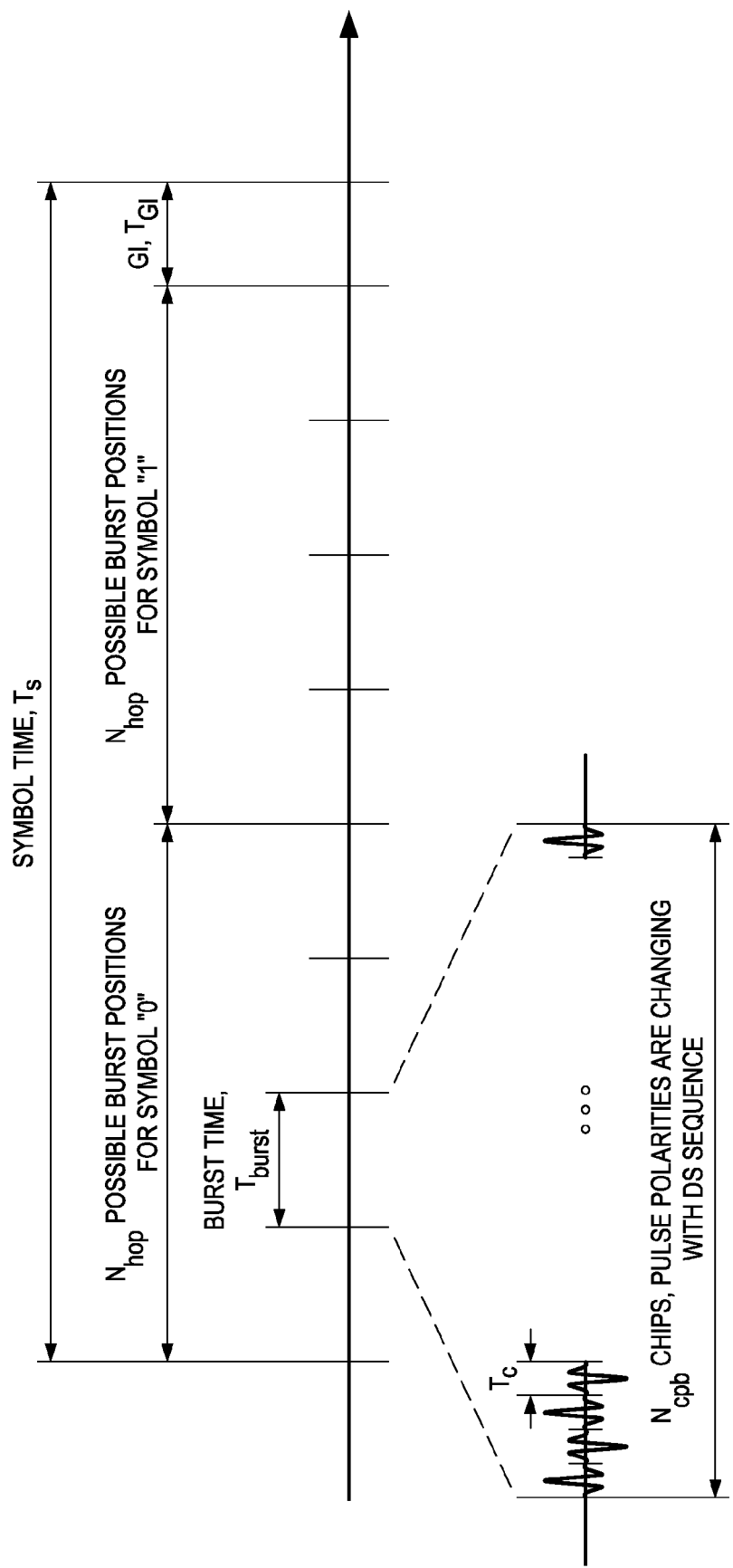
FIGS. 3A and 3B shows the structure of a symbols generated by an IR-UWB modulator in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "software" includes any executable code capable of running on a processor, regardless of the media used to store the software. Thus, code stored in memory (e.g., non-volatile memory), and sometimes referred to as "embedded firmware," is included within the definition of software. The "order" of a symbol is the number of values representable by the symbol (e.g., a binary (one-bit) symbol is of order 2, a quaternary (2-bit) symbol is of order 4, an M-ary symbol is of order M).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The physical layer ("PHY") portion of a transceiver operates to convert symbols (e.g., bits) to transmittable signals, and to convert received signals into symbols. PHY design should consider channel characteristics. Embodiments of the present disclosure include an impulse-radio ultra-wideband ("IR-UWB") PHY tailored for use with a body area network ("BAN").

FIG. 1 shows a representative BAN 100 in accordance with various embodiments. The BAN 100 includes one or more nodes 102 A/B/C and a hub 106. A node 102 may include a sensor (e.g., motion, temperature, electrical activity sensor, etc.), a processor, an output device (e.g., audio or video transducers), etc. Each node 102 and the hub 106 may include a transceiver 104 that communicatively couples the node 102 to one or more other nodes 102 and/or to the hub 106. Embodiments of the transceiver 104 are configured for communication over relatively short distances applicable to the BAN 100. For example, the distance between the hub 106 and any node 102 A/B/C may be three meters or less in the BAN 100.

The transceiver 104 includes a PHY configured for use in the BAN 100. Embodiments of the PHY use pulse position modulation ("PPM"). Some embodiments use PPM in conjunction with a different modulation technique, such as binary phase shift keying ("BPSK"). Other embodiments use PPM exclusively, thereby reducing implementation complexity when compared to embodiments using PPM in combination with another modulation technique. Some embodiments of the PHY use a channel bandwidth of 512 mega-hertz ("MHz") or 528 MHz, with center frequencies that enable a low-power transceiver 104 architecture.

Embodiments of the PHY insert a single guard interval at the end of a symbol period. The guard interval is a fixed period and its length is determined by maximum delay spread of channel. Thus, the ratio of guard interval to the symbol period changes as the data rate changes. In particular, the ratio of guard interval to symbol period decreases as the data rate is decreased. By using this symbol structure, the number of bursts per symbol may also be increased when compared to an embodiment allocating two guard intervals per symbol period, which results in enhanced interference mitigation. Alternatively, this symbol structure allows for an increase in data rate while maintaining the same burst length as an embodiment allocating two guard intervals per symbol period.

FIG. 2 shows a block diagram for a PHY portion of an IR-UWB transmitter 200 in accordance with various embodiments. The PHY includes a scrambler 202, a forward error correction ("FEC") encoder 204, a symbol mapper 206, a pulse generator 208, radio frequency ("RF") circuitry 210, and an antenna 212. The scrambler 202 is a randomizing system used to eliminate long runs of identical symbols. The scrambler 202 may be implemented, for example, as either a side-stream scrambler (e.g., per IEEE 802.11a or ECMA-368) or a self-synchronizing scrambler (e.g., per IEEE 802.11b).

The FEC encoder 204 adds redundancy to the transmitted symbols, thereby allowing a receiver to identify and correct channel induced errors in received data. As shown below in Tables 5-6, the PHY of the present disclosure supports both coded and uncoded data rates.

The symbol mapper 206 maps a scrambled/encoded input symbol to a signal representative of the symbol. More specifically, the symbol mapper 206 determines the position of the symbol in the time-domain, i.e., PPM. The symbol mapper 206 also determines the time-hopping sequence applied to the symbol, and the polarities (or other parameters) of the pulses (per an applicable spreading sequence applied to the pulses) or other waveforms used to represent the symbol.

The symbol mapper 206 generates a single guard interval at the end of each symbol transmission. In some embodiments, the guard interval is a fixed period and its length is determined based on maximum delay spread of channel. Therefore, the ratio of guard interval to symbol period changes as the data rate changes.

The pulse generator 208 generates pulses at the time and with the polarities specified by the symbol mapper 206. In some embodiments, the pulse generator 208 generates pulses having a width of approximately 2 nano-seconds ("ns"). In other embodiments, the pulse generator 208 generates pulses of a different width or other waveforms (e.g., a chirp).

The RF circuitry 210 drives the output of the pulse generator 208 onto the antenna 212 for conversion from conducted to an airwave form.

The scrambler 202, the FEC encoder 204, and the symbol mapper 206 may be implemented in the digital domain by dedicated circuitry, processors executing software programming, or a combination of the two. The pulse generator 208 can be implemented in either the analog or the digital domain, but in some embodiments, implementation in the analog domain is advantageous for power reasons.

FIG. 3A shows the structure of a symbol generated by an IR-UWB transmitter 200 in accordance with various embodiments. Symbol time $T_S$ is the interval of time occupied by one symbol. For an un-coded system, symbol rate is given by $R_S=1/T_S$. When an FEC code is used, the symbol rate is $R_S=1/T_S=R_b/r$, where $R_b$ is the data rate in bits per second and r is the code rate.

A guard interval of length $T_{GI}$ is reserved at the end of each symbol as shown in FIG. 3A. The guard interval may be set to a value greater than the maximum delay spread of the channel in order to minimize the inter-symbol interference ("ISI"). As a result, the ratio of guard interval to the symbol time becomes smaller as data rate decreases.

The symbol time excluding the guard interval is then divided into $N_{burst}=2N_{hop}$ slots, where each slot is of length $T_{burst}$. That is, $T_S=2N_{hop}T_{burst}+T_{GI}$. The slot time (or burst time) is an integer multiple of the chip time $T_c$. That is, $T_{burst}=N_{cpb}T_c$, where $N_{cpb}$ is the number of chips per burst. The chip time $T_c$ is approximately 2 ns in some embodiments. Other embodiments use a different chip time.

Within a symbol, $N_{cpb}$ pulses are transmitted consecutively (in a burst manner) during a single selected time slot, while no signal is transmitted during the remaining $(2N_{hop}-1)$ slots and the guard interval. The time slot on which the pulse burst is transmitted during the k-th symbol interval is determined by the following two pieces of information: (1) the data symbol $d^{(k)}$, and (2) the time-hopping ("TH") sequence $h^{(k)} \in \{0, 1, \ldots, N_{hop}-1\}$.

The data symbol is modulated onto the selected burst position (i.e., burst position modulation). Note that the burst positions for a symbol "0" and a symbol "1" are separated by $T_{BPM}=N_{hop}T_{burst}$. The TH sequence $h^{(k)} \in \{0, 1, \ldots, N_{hop}-1\}$ is changing across symbols, and its value (in conjunction with the data symbol value) determines the time slot during which the pulse burst is transmitted. The polarities of the pulses within the pulse burst are modulated using a chip scrambling sequence (or direct-sequence ("DS") spreading sequence), $c_{kN_{cpb}+n} \in \{-1,1\}$. This modulation scheme may be called binary burst modulation ("BPM") with TH and DS, or more compactly, "BPM-TH/DS."

More precisely, the transmit signal during the k-th symbol interval may be expressed as:

$$x^{(k)}(t) = \sum_{n=0}^{N_{cpb}-1} c_{kN_{cpb}+n} p(t - d^{(k)} T_{BPM} - h^{(k)} T_{burst} - nT_c)$$

where
- p(t): the transmitted pulse shape at the antenna input,
- $c_{kN_{cpb}+n} \in \{-1, 1\}$, n=0, 1, ... $N_{cpb}-1$: the chip scrambling code (or DS spreading sequence) used during the k-th symbol interval,
- $d^{(k)} \in \{0,1\}$: the k-th data symbol carrying information,
- $h^{(k)} \in \{0, 1, \ldots, N_{hop}-1\}$: the time-hopping position for the burst during the k-th symbol interval,
- $N_{cpb}$: the number of chips per burst,
- $T_{BPM} = N_{hop} T_{burst}$,
- $T_{burst} = N_{cpb} T_c$: slot time (or burst time),
- $T_c$: chip time.

The time-hopping sequence $h^{(k)}$ provides some immunity from multi-user interference. The chip scrambling sequence $c_{kN_{cpb}+n}$ provides additional interference suppression as well as spectral smoothing of the transmitted waveform.

In some embodiments, the time-hopping sequence $h^{(k)}$ and the chip scrambling sequence $c_{kN_{cpb}+n}$ can be generated by using a linear feedback shift register (LFSR). There are various ways to generate these sequences, including reading them from memory.

For embodiments using M-ary PPM, the symbol time excluding the guard interval is divided into $N_{burst} = MN_{hop}$ slots, where each slot is of length $T_{burst}$. That is $T_s = MN_{hop} T_{burst} + T_{GI}$. The slot time (or burst time) is an integer multiple of the chip time $T_c$. That is, $T_{burst} = N_{cpb} T_C$, where $N_{cpb}$ is the number of chips per burst.

The transmit signal during the k-th symbol interval may be expressed as:

$$x^{(k)}(t) = \sum_{n=0}^{N_{cpb}-1} c_{kN_{cpb}+n} p(t - d^{(k)} T_{BPM} - h^{(k)} T_{burst} - nT_c)$$

where
- p(t): the transmitted pulse shape at the antenna input,
- $c_{kN_{cpb}+n} \in \{-1, 1\}$, n=0, 1, ..., $N_{cpb}-1$: the chip scrambling code (or DS spreading sequence) used during the k-th symbol interval,
- $d^{(k)} \in \{0, 1, \ldots, M-1\}$: the k-th data symbol carrying information,
- $h^{(k)} \in \{0, 1, \ldots, N_{hop}-1\}$: the time-hopping position for the burst during the k-th symbol interval,
- $N_{cpb}$: the number of chips per burst,
- $T_{BPM} = N_{hop} T_{burst}$,
- $T_{burst} = N_{cpb} T_c$: slot time (or burst time),
- $T_c$: chip time.

Figure 3B:
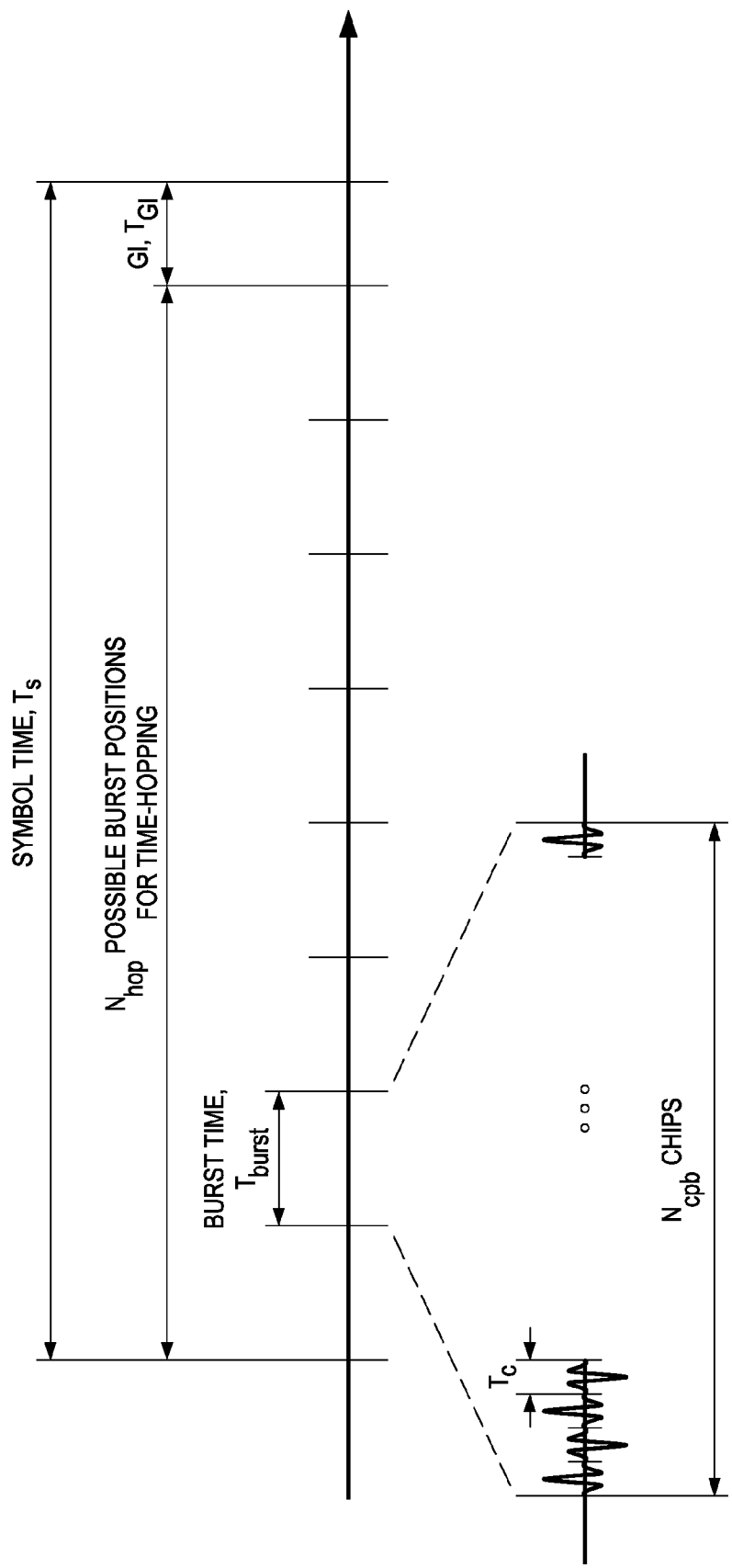

FIG. 3B shows the structure of a symbol generated by an IR-UWB transmitter 200 configured for on/off keying ("OOK"), pulse amplitude modulation ("PAM") or (differential) phase-shift keying ("PSK") including (differential) binary PSK ("BPSK") in accordance with various embodiments. The symbol time excluding the guard interval is divided into $N_{burst} = N_{hop}$ slots, where each slot is of length $T_{burst}$. That is $T_s = N_{hop} T_{burst} + T_{GI}$. The slot time (or burst time) is an integer multiple of the chip time $T_c$. That is, $T_{burst} = N_{cpb} T_c$, where $N_{cpb}$ is the number of chips per burst.

The transmit signal during the k-th symbol interval may be expressed as shown:

$$x^{(k)}(t) = s^{(k)} \sum_{n=0}^{N_{cpb}-1} c_{kN_{cpb}+n} p(t - h^{(k)} T_{burst} - nT_c)$$

where
- $s^{(k)}$: the k-th data symbol carrying information, more specifically
  - OOK: $s^{(k)} \in \{0,1\}$ one is selected depending on information data to transmit
  - PAM: $s^{(k)} \in \{0, 1, \ldots, M-1\}$, one is selected depending on information data to transmit
  - BPSK: $s^{(k)} \in \{-1,1\}$ one is selected depending on information data to transmit
  - PSK:

$$s^{(k)} \in \left\{ \exp\left(\frac{j2\pi p}{M} + \phi\right) : p = 0, 1, \ldots, M-1 \right\}$$

where $\phi$ is a constant phase, one is selected depending on the data symbol
  - Differential PSK has a form of $s^{(k)} = s^{(k)} \exp(j\phi_k)$ where $\phi_k$ changes depending on the k-th information data to transmit.
- p(t): the transmitted pulse shape at the antenna input,
- $c_{kN_{cpb}+n} \in \{-1,1\}$, n=0, 1, ..., $N_{cpb}-1$: the chip scrambling code (or DS spreading sequence) used during the k-th symbol interval,
- $h^{(k)} \in \{0, 1, \ldots, N_{hop}-1\}$: the time-hopping position for the burst during the k-th symbol interval,
- $N_{cpb}$: the number of chips per burst,
- $T_{burst} = N_{cpb} T_c$: slot time (or burst time),
- $T_c$: chip time.

Figure 4:
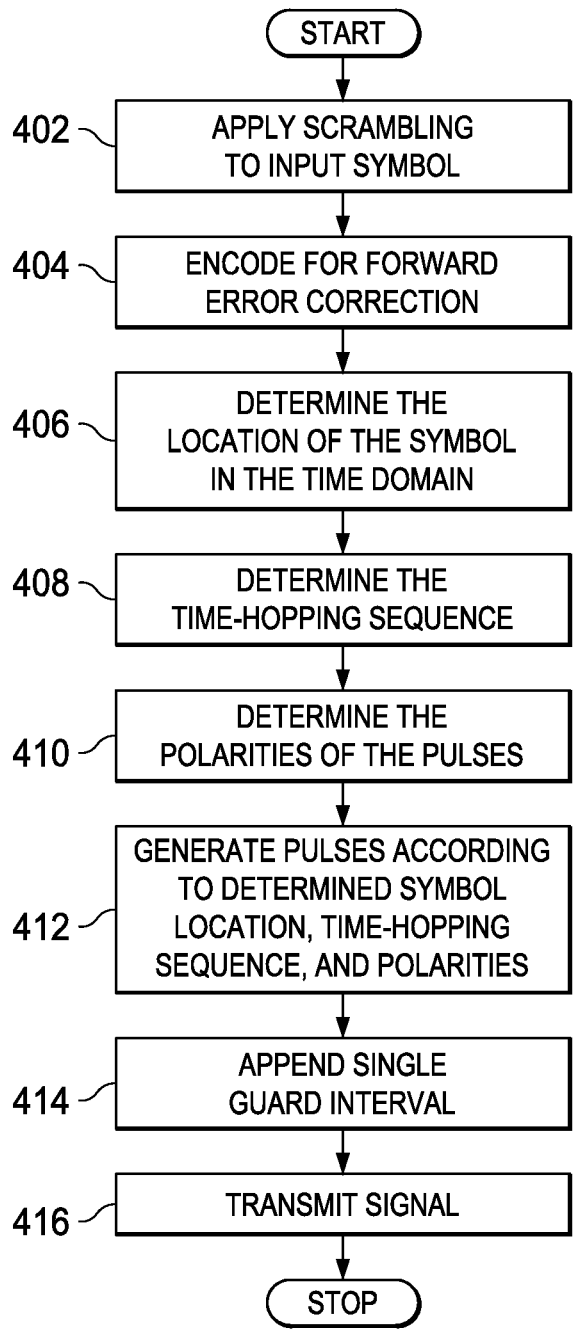
FIG. 4 shows a flow diagram for a method of IR-UWB modulation in accordance with various embodiments.

FIG. 4 shows a flow diagram for a method of IR-UWB modulation in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 4, as well as other operations described herein, can be implemented, at least in part, as instructions stored in a computer readable medium and executed by a processor.

In block 402, the scrambler 202 randomizes the input symbol to eliminate long sequences of like symbols. Various scrambling techniques may be employed. For example, a self-synchronous scrambler or a side-stream scrambler may be used. A self-synchronous scrambler is a scrambler whereby the current state of the scrambler is derived from the prior bits of the scrambled output. Consequently, the descrambler can acquire the correct state directly from the received stream. A side-stream scrambler is a scrambler in which the current state of the scrambler is dependent only on the prior state of the scrambler and not on the transmitted data. Therefore, the descrambler must acquire state either by searching for a state that decodes a known pattern or by agreement to start at a known state in synchronization with the scrambler.

In block 404, the FEC encoder encodes the scrambled symbol (e.g., a block of scrambled symbols) to provide redundancy that allows an FEC decoder in the receiver to detect and correct at least some post transmission errors. Some embodiments of the PHY may employ a block code (e.g., a Bose-Chaudhuri-Hocquenghem or Reed-Solomon code). Embodiments are not limited to any particular method of FEC coding.

In block 406, the symbol mapper 206 determines the location of the symbol in the time domain, at what point in time a signal burst representing the symbol will be generated. Referring to FIG. 3A, the symbol mapper 206 determines, based on the symbol value to be transmitted, whether a burst will be generated in the "0" or "1" symbol value defined time slots of the symbol time $T_S$.

In block 408, the symbol mapper 206 determines the time-hopping sequence. The time-hopping sequence identifies a sub time slot of the symbol value based time slots during which a pulse burst will be generated.

In block 410, the symbol mapper 206 determines the polarities of the pulses to be generated during the pulse burst. The polarities of the pulses in the pulse burst are determined based on a chip scrambling sequence used to modulate the pulses.

In block 412, the pulse generator 208, generates a pulse burst in accordance with the symbol location (derived from symbol value), time-hopping sequence, and polarity determined by the symbol mapper 206.

In block 414, the RF circuitry drives the signal generated by the pulse generator onto the antenna 212.

In block 416, a single guard interval is appended to the end of the transmitted symbol. In at least some embodiments, the guard interval is a fixed time period that is determined based on maximum delay spread of channel. Consequently, the ratio of guard interval to symbol time decreases as the data rate is decreased.

Tables 1 and 2 below summarize the power spectral density ("PSD") for the UWB band in various countries. The UWB low band (shown in Table 1) is not ideal for low-complexity BAN devices since regulations require devices that operate in this band support detection and avoidance ("DAA") mechanisms, which increase complexity. If DAA is not supported, then devices operating the UWB low band must operate in a low duty cycle ("LDC") mode, which does not allow the devices to support the higher data rates, such as 1 Mbps. The UWB high band does not require either DAA, or LDC making the high band attractive for a low-complexity implementation.

TABLE 1

UWB Low Band

| | PSD | Frequency Bands | Remarks |
|---|---|---|---|
| Australia | N/A | N/A | N/A |
| EU | −41.3 dBm/MHz | 3.1-4.8 GHz | LDC or DAA is needed |
| | | 4.2-4.8 GHz | By Dec. 31, 2010 |
| Japan | −41.3 dBm/MHz | 3.4-4.8 GHz | DAA is needed |
| | | 4.2-4.8 GHz | By Dec. 31, 2010 |
| Korea | −41.3 dBm/MHz | 3.1-4.8 GHz | LDC or DAA is needed |
| | | 4.2-4.8 GHz | By Dec. 31, 2010 |
| USA | −41.3 dBm/MHz | 3.1-10.6 GHz | |

TABLE 2

UWB High Band

| | Frequency Bands | PSD | Remarks |
|---|---|---|---|
| Australia | N/A | N/A | N/A |
| EU | 6-8.5 GHz | −41.3 dBm/MHz | |
| Japan | 7.25-10.25 GHz | −41.3 dBm/MHz | |
| Korea | 7.2-10.2 GHz | −41.3 dBm/MHz | |
| USA | 3.1-10.6 GHz | −41.3 dBm/MHz | |
| Common | 7.25-8.5 GHz | −41.3 dBm/MHz | |

Embodiments of the present disclosure use the frequency bands enumerated in Table 3 for systems with 512 MHz bandwidth. Table 3 also shows the allocation of the frequency bands for various countries. The proposed frequency bands were selected such that at least three non-overlapping 512 MHz frequency bands are available in each country. The PHY can support four piconets per 512 MHz frequency band by using the IR-UWB modulation scheme discussed above. Therefore, at least 12 piconets can be supported in each country. The band plan or center frequencies of the selected frequency bands allow for a low-power transceiver architecture.

TABLE 3

Frequency Bands for 512 MHz Bandwidth

| Band Number | Supported Region | Bandwidth (MHz) | Low Frequency (MHz) | Center Frequency (MHz) | High Frequency (MHz) |
|---|---|---|---|---|---|
| 1 | US, EU | 512 | 6400 | 6656 | 6912 |
| 2 | US, EU | 512 | 6912 | 7168 | 7424 |
| 3 | US, EU, Japan, Korea | 512 | 7424 | 7680 | 7936 |
| 4 | US, EU, Japan, Korea | 512 | 7936 | 8192 | 8448 |
| 5 | US, Japan, Korea | 512 | 8448 | 8704 | 8960 |

Embodiments use the frequency bands enumerated in Table 4 for systems with 528 MHz bandwidth. All the bands are located in the UWB high band, therefore no DAA mechanism need be implemented in the transceiver. The frequency bands are a part of WiMedia frequency bands (WiMedia BAND_ID=[7, 8, . . . , 14]). Advantageously, embodiments of BAN transceivers using the proposed frequency bands avoid partial frequency-band overlap with WiMedia systems.

TABLE 4

Frequency Bands for 528 MHz Bandwidth

| Band Number | Supported Region | Bandwidth (MHz) | Low Frequency (MHz) | Center Frequency (MHz) | High Frequency (MHz) |
|---|---|---|---|---|---|
| 1 | US, EU | 528 | 6336 | 6600 | 6864 |
| 2 | US, EU | 528 | 6864 | 7128 | 7392 |
| 3 | US, EU, Japan, Korea | 528 | 7392 | 7656 | 7920 |
| 4 | US, EU, Japan, Korea | 528 | 7920 | 8184 | 8448 |
| 5 | US, Japan, Korea | 528 | 8448 | 8712 | 8976 |
| 6 | US, Japan, Korea | 528 | 8976 | 9240 | 9504 |
| 7 | US, Japan, Korea | 528 | 9504 | 9768 | 10032 |
| 8 | US | 528 | 10032 | 10296 | 10560 |

Table 5 gives exemplary system parameters for an uncoded system. System parameters are selected to provide an integer number of chips in a burst time. Note that the parameters in this table can be modified to generate any number of data rates. The transmit ("Tx") pulse shape listed below is exemplary and other pulse shapes can be used.

TABLE 5

Exemplary Parameters for an Uncoded System

| | Data rate (kbps), $R_b$ | | | | |
|---|---|---|---|---|---|
| | 50 | 200 | 1000 | 2000 | 10039.21569 |
| Modulation | BPM-TH/DS | BPM-TH/DS | BPM-TH/DS | BPM-TH/DS | BPM-TH/DS |
| FEC code rate, r | 1 | 1 | 1 | 1 | 1 |
| Symbol rate (ksps), $R_s$ | 50 | 200 | 1000 | 2000 | 10039.21569 |
| Symbol period (ns), $T_s$ | 20000 | 5000 | 1000 | 500 | 99.609375 |
| Bandwidth, chip rate (MHz) | 512 | 512 | 512 | 512 | 512 |
| Chip time (ns), $T_c$ | 1.953125 | 1.953125 | 1.953125 | 1.953125 | 1.953125 |
| Tx pulse shape | root-raised cosine | root-raised cosine | root-raised cosine | root-raised cosine | root-raised cosine |
| Guard interval ($T_c$) | 128 | 64 | 32 | 24 | 15 |
| Guard interval (ns), $T_{GI}$ | 250 | 125 | 62.5 | 46.875 | 29.296875 |
| Symbol period - GI (ns) | 19750 | 4875 | 937.5 | 453.125 | 70.3125 |
| # chips per symbol, $N_{cps}$ | 10240 | 2560 | 512 | 256 | 51 |
| # chips in (symbol - GI) | 10112 | 2496 | 480 | 232 | 36 |
| # bursts in symbol, $N_{burst}$ | 128 | 64 | 16 | 8 | 4 |
| # of chips in burst, $N_{cpb}$ | 79 | 39 | 30 | 29 | 9 |
| Burst length (ns), $T_{burst}$ | 154.296875 | 76.171875 | 58.59375 | 56.640625 | 17.578125 |
| Average PRF in bust Tx region (MHz) | 4 | 8 | 32 | 64 | 128 |
| Average PRF (MHz) | 3.95 | 7.8 | 30 | 58 | 90.35294118 |
| 1/duty-cycle | 129.6202532 | 65.64102564 | 17.06666667 | 8.827586207 | 5.666666667 |

PRF: pulse repetition frequency

Table 6 gives exemplary system parameters for a coded system. (15,11) block code, e.g, BCH code, is assumed. Other types of codes and coding rates can be also be used and the table entries can be updated accordingly. System parameters are selected to have integer number of chips in a burst time. Note that the parameters in this table can be modified to generate any number of data rates. The transmit ("Tx") pulse shape listed below is exemplary and other pulse shapes can be used.

TABLE 6

Exemplary Parameters for a Coded System, (15, 11) Block Code

| | Data rate (kbps), $R_b$ | | | | |
|---|---|---|---|---|---|
| | 50.00221956 | 200.0355177 | 1001.244444 | 2007.843137 | 10147.74775 |
| Modulation | BPM-TH/DS | BPM-TH/DS | BPM-TH/DS | BPM-TH/DS | BPM-TH/DS |
| FEC code rate, r | 0.733333333 | 0.733333333 | 0.733333333 | 0.733333333 | 0.733333333 |
| Symbol rate (ksps), $R_s$ | 68.18484485 | 272.7757059 | 1365.333333 | 2737.967914 | 13837.83784 |
| Symbol period (ns), $T_s$ | 14666.01563 | 3666.015625 | 732.421875 | 365.234375 | 72.265625 |
| Bandwidth, chip rate (MHz) | 512 | 512 | 512 | 512 | 512 |

TABLE 6-continued

Exemplary Parameters for a Coded System, (15, 11) Block Code

| | Data rate (kbps), $R_b$ | | | | |
|---|---|---|---|---|---|
| | 50.00221956 | 200.0355177 | 1001.244444 | 2007.843137 | 10147.74775 |
| Chip time (ns), $T_c$ | 1.953125 | 1.953125 | 1.953125 | 1.953125 | 1.953125 |
| Tx pulse shape | root-raised cosine | root-raised cosine | root-raised cosine | root-raised cosine | root-raised cosine |
| Guard interval ($T_c$) | 85 | 53 | 31 | 19 | 13 |
| Guard interval (ns), $T_{GI}$ | 166.015625 | 103.515625 | 60.546875 | 37.109375 | 25.390625 |
| Symbol period - GI (ns) | 14500 | 3562.5 | 671.875 | 328.125 | 46.875 |
| # chips per symbol, $N_{cps}$ | 7509 | 1877 | 375 | 187 | 37 |
| # chips in (symbol - GI) | 7424 | 1824 | 344 | 168 | 24 |
| # bursts in symbol, $N_{burst}$ | 64 | 32 | 8 | 8 | 4 |
| # of chips in burst, $N_{cpb}$ | 116 | 57 | 43 | 21 | 6 |
| Burst length (ns), $T_{burst}$ | 226.5625 | 111.328125 | 83.984375 | 41.015625 | 11.71875 |
| Average PRF in bust Tx region (MHz) | 8 | 16 | 64 | 64 | 128 |
| Average PRF (MHz) | 7.909442003 | 15.54821524 | 58.70933333 | 57.4973262 | 83.02702703 |
| 1/duty-cycle | 64.73275862 | 32.92982456 | 8.720930233 | 8.904761905 | 6.166666667 |

Table 7 gives alternative exemplary system parameters for a coded system. Various code rates are shown. Other coding rates can be also be used and the table entries can be updated accordingly. System parameters are selected to have integer number of chips in a burst time. Note that the parameters in this table can be modified to generate any number of data rates.

TABLE 7

Exemplary Parameters for a Coded System

| | Data rate (kbps), $R_b$ | | | | | | |
|---|---|---|---|---|---|---|---|
| | 113.5129 | 224.7092 | 523.3285 | 1015.8730 | 1918.8713 | 5264.0693 | 10070.3934 |
| Bandwidth, chip rate (MHz) | 512 | 512 | 512 | 512 | 512 | 512 | 512 |
| Chip time (ns), $T_c$ | 1.953125 | 1.953125 | 1.953125 | 1.953125 | 1.953125 | 1.953125 | 1.953125 |
| Modulation | BPM-TH/DS | BPM-TH/DS | BPM-TH/DS | BPM-TH/DS | BPM-TH/DS | BPM-TH/DS | BPM-TH/DS |
| FEC code rate, r | 16/31 | 16/31 | 51/63 | 51/63 | 51/63 | 57/63 | 57/63 |
| # bursts in symbol, $N_{burst}$ | 32 | 32 | 32 | 32 | 32 | 16 | 16 |
| # hop bursts, $N_{hop}$ | 16 | 16 | 16 | 16 | 16 | 8 | 8 |
| # of chips in burst, $N_{cpb}$ | 72 | 36 | 24 | 12 | 6 | 4 | 2 |
| Guard interval ($T_c$) | 24 | 24 | 24 | 24 | 24 | 24 | 14 |
| # chips per symbol, $N_{cps}$ | 2328 | 1176 | 792 | 408 | 216 | 88 | 46 |
| Burst length (ns), $T_{burst}$ | 140.6250 | 70.3125 | 46.8750 | 23.4375 | 11.7188 | 7.8125 | 3.9063 |
| Guard interval (ns), $T_{GI}$ | 46.8750 | 46.8750 | 46.8750 | 46.8750 | 46.8750 | 46.8750 | 27.3438 |
| Symbol period (ns), $T_s$ | 4546.8750 | 2296.8750 | 1546.8750 | 796.8750 | 421.8750 | 171.8750 | 89.8438 |
| Symbol rate (ksps), $R_s$ | 219.9313 | 435.3741 | 646.4646 | 1254.9020 | 2370.3704 | 5818.1818 | 11130.4348 |
| Average PRF (MHz) | 15.8351 | 15.6735 | 15.5152 | 15.0588 | 14.2222 | 23.2727 | 22.2609 |
| 1/duty-cycle | 32.3333 | 32.6667 | 33.0000 | 34.0000 | 36.0000 | 22.0000 | 23.0000 |

The above discussion is meant to be illustrative of the principles and various embodiments of the present invention. Numerous variations and modifications will become apparent to those skilled in the art once the above disclosure is fully appreciated. For example, while embodiments of the present disclosure have been presented in the context of body area networks, those skilled in the art of wireless communications will understand that the disclosed modulation system is applicable various wireless applications. It is intended that the following claims be interpreted to embrace all such variations and modifications.

What is claimed is:
1. A body area network, comprising:
an impulse-radio ultra-wideband ("IR-UWB") transmitter configured to apply burst position modulation exclusively, and to apply a single guard interval period per symbol transmitted; and an IR-UWB receiver configured to receive transmissions of the ultra-wideband impulse-radio transmitter;

wherein a ratio of the guard interval period to a symbol transmission period is reduced as a data rate used to transmit the symbol decreases per symbol transmission period, wherein the IR-UWB transmitter is configured to generate a plurality of pulses within a time-slot selected based on a value of a symbol to be transmitted and a time-hopping sequence value, and to determine a polarity of each of the pulses based on a direct-sequence spreading sequence.

2. The body area network of claim 1, wherein the IR-UWB transmitter is configured to transmit a value of the symbol over a 528 mega-hertz ("MHz") bandwidth having a center frequency selected from a group of center frequencies consisting of 6.600 giga-hertz ("GHz"), 1.7128 GHz, 7.656 GHz, 8.184 GHz, 8.712 GHz, 9.240 GHz, 9.768 GHz, and 10.296 GHz.

3. The body area network of claim 1, wherein the IR-UWB transmitter is configured to transmit a value of the symbol over a 512 MHz bandwidth having a center frequency selected from a group of center frequencies consisting of 6.656 GHz, 7.168 GHz, 7.680 GHz, 8.192 GHz, and 8.704 GHz.

* * * * *